Nov. 15, 1938.  C. A. SAWTELLE  2,136,470

BRAKE MECHANISM

Filed July 26, 1937  2 Sheets-Sheet 1

INVENTOR
CHARLES A. SAWTELLE
BY
Whittemore Hulbert & Belknap
ATTORNEYS

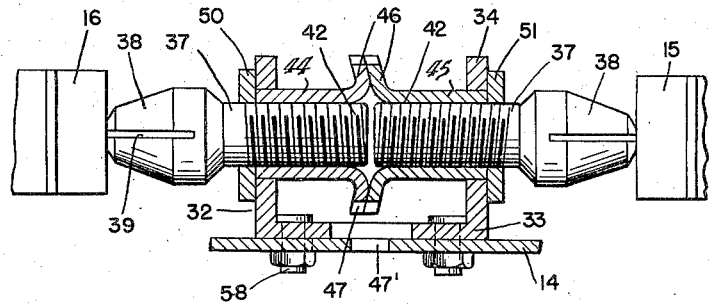
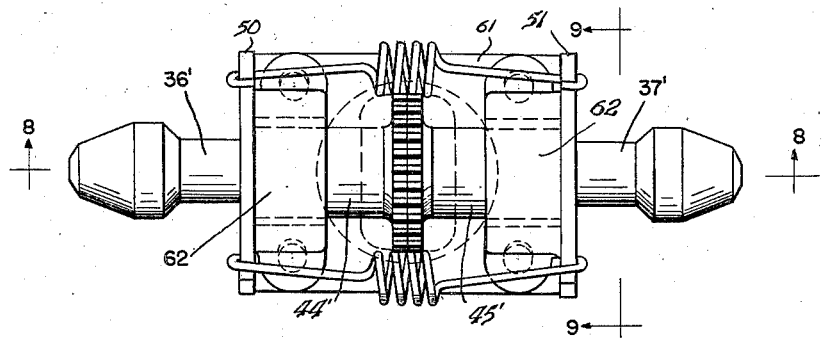
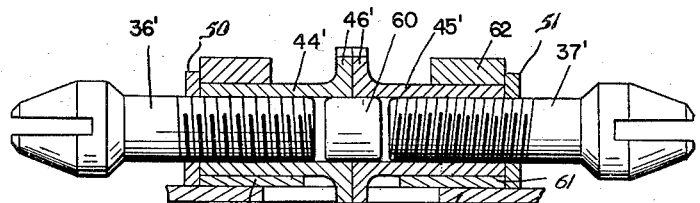
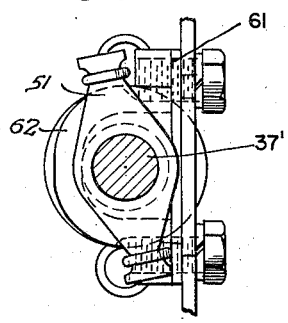
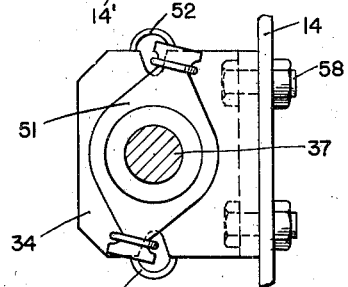
INVENTOR
CHARLES A. SAWTEL
ATTORNEYS Patented Nov. 15, 1938

2,136,470

UNITED STATES PATENT OFFICE 2,136,470

BRAKE MECHANISM

Charles A. Sawtelle, Detroit, Mich., assignor to Kelsey-Hayes Wheel Company, Detroit, Mich., a corporation of Delaware Application July 26, 1937, Serial No. 155,801

13 Claims. (Cl. 188—79.5)

This invention relates generally to brake mechanism and refers more particularly to brakes of the type having brake friction means supported within a brake drum for shifting movement circumferentially of the drum in opposite directions to provide for obtaining servo action in both directions of rotation of the drum.

It is one of the principal objects of this invention to provide an adjustment device supported between the ends of the friction means in both directions of rotation of the drum and embodying means effective to accurately center the friction means within the brake drum.

Another advantageous feature of the present invention resides in the provision of an adjustment device of the character set forth rendering it possible to adjust one of the brake shoes at a faster rate than the other in the event one shoe wears to a greater extent than the other.

The foregoing, as well as other objects, will be made more apparent as this description proceeds, especially when considered in connection with the accompanying drawings, wherein:—

Figure 4 is a sectional view taken substantially on the plane indicated by the line 4—4 of Figure 3;

Figure 6 is a cross sectional view taken substantially on the plane indicated by the line 6—6 of Figure 3;

Figure 7 is a fragmentary side elevational view of brake mechanism illustrating a modified form of adjusting device;

Figure 8 is a sectional view taken substantially on the plane indicated by the line 8—8 of Figure 7; and Figure 9 is a cross sectional view taken substantially on the plane indicated by the line 9—9 of Figure 8.

Figure 1:
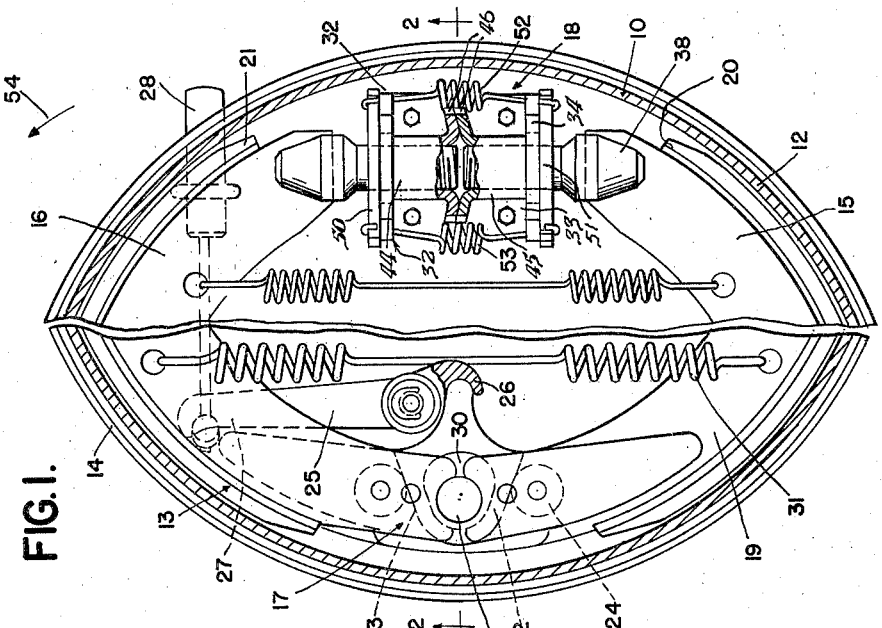
Figure 1 is a side elevational view, partly in section, of a brake constructed in accordance with this invention.
Figure 2:
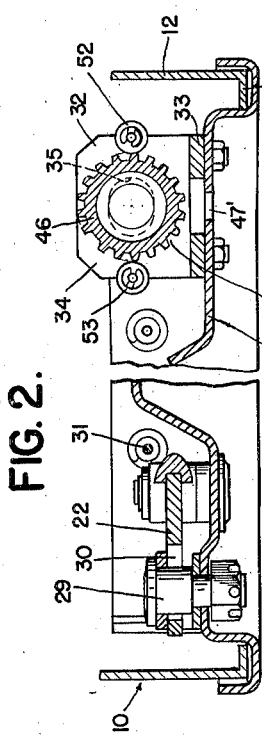
Figure 2 is a sectional view taken substantially on the plane indicated by the line 2—2 of Figure 1.

The brake mechanism selected herein for the purpose of illustration is provided with a brake drum 10, having a web 11 and an annular brake flange 12 extending axially from the periphery of the web for engagement with the brake friction means 13. In accordance with conventional practice, the rear side of the drum is closed by a backing plate 14 and the brake friction means 13 is supported on the backing plate for shifting movement circumferentially of the drum relative to the backing plate in both directions of rotation of the brake drum. In the present instance, the brake friction means comprises two shoes 15 and 16 having the opposite ends spaced from each other for respectively receiving therebetween a suitable actuator 17 and an adjustment device 18.

The shoes are T-shaped in cross section having webs 19 extending radially of the brake drum and having head portions or flanges 20 projecting axially of the drum adjacent the brake flange 12 for engagement therewith. A brake lining 21 having the desired coefficient of friction is secured to the exterior surface of the flange 20 of each shoe and is adapted to engage the inner surface of the brake flange 12 when the shoes are moved outwardly relative to the brake drum.

The shoes are moved outwardly relative to the brake drum to engage the friction linings 21 with the brake flange 12 by means of the actuator 17, shown in Figure 1 as being of the radially outwardly movable wedge type. It is to be understood, however, that any one of a number of differently designed actuators may be employed for expanding the brake shoes into engagement with the brake flange without interfering with the present invention and, for this reason, this invention should not be considered as limited to the specific type of actuator selected herein for the purpose of illustration. However, the actuator employed must be of such a nature as to permit shifting movement of the friction means in both of the two directions of rotation of the brake drum. In detail, the actuator shown herein comprises a radially outwardly movable wedge 22 having radially inwardly diverging opposite edges 23 engageable with suitable rollers 24 which are carried by the ends of the shoes at one side of the drum. The wedge is moved outwardly to expand the shoes into engagement with the brake flange by means of a lever 25 pivotally supported adjacent one end on the backing plate 14 and having the short arm 26 engaging the radially inner end of the wedge 22. The end of the long arm 27 of the lever is engaged by a flexible cable 28 which extends through the backing plate and is connected to a suitable control (not shown). The arrangement is such that when the long arm of the lever is swung in a direction generally inwardly of the brake drum by the cable 28, the short arm moves the wedge 22 radially outwardly and the diverging edges 23 of the wedge cooperate with the rollers 24 on the adjacent ends of the brake shoes to move the latter outwardly into engagement with the brake flange of the drum.

The wedge 22 is supported on the backing plate by means of a stud 29 extending axially of the drum through an opening 30 in the wedge. The dimensions of the opening 30 transversely of the wedge or peripherally of the brake drum are greater than the diameter of the portion of the stud extending through the opening to provide the clearance required for the wedge to shift with the brake friction means in opposite directions circumferentially of the brake drum. In addition, the stud also forms an abutment with the adjacent ends of the shoes when the shoes are in their released positions and the latter are yieldably maintained into engagement with the abutment by means of retraction spring 31, having the opposite ends connected to the shoes.

Figure 5:
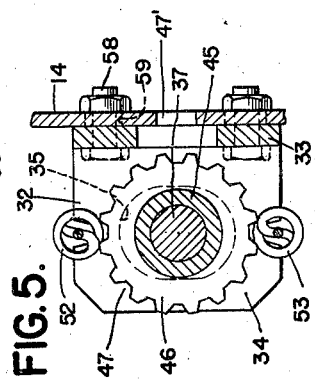
Figure 5 is a cross sectional view taken substantially on the plane indicated by the line 5—5 of Figure 3.

It has previously been stated that an adjustment device 18 is supported between the ends of the brake shoes opposite the actuator ends of the latter, and the purpose of this device is to vary the clearance between the friction linings 21 on the shoes and the brake flange 12 of the drum. In detail, the adjustment device 18 comprises a U-shaped bracket 32 having a base portion 33 secured to the front side of the backing plate 14 between the adjustment ends of the brake shoes and having the legs or flanges 34 extending axially forwardly from the base 33. It will, of course, be understood from the foregoing that the flanges 34 are disposed in parallel planes perpendicular to the plane of rotation of the brake drum and, as shown in Figure 5, the flanges are provided with aligned openings 35 therethrough of sufficient dimension to slidably receive the adjustment links 36 and 37. It will also be seen from Figure 5 that the openings 35 are elongated radially of the drum to permit radial movement of the shoes when the latter are applied and when the drum expands due to heat. The adjustment links extend in a direction generally circumferentially of the drum and are provided with enlarged heads 38 for engagement with the adjacent ends of the brake shoes. The heads 38 of the adjustment links are radially slotted, as at 39, to receive the adjacent ends of the web portions 19 of the brake shoes and prevent movement of the latter relative to the links in directions axially of the brake drum. The bottom of the slots 39 and the adjacent edges of the webs 19 on the shoes are curved in the manner shown in Figure 3 to provide relatively free radial movement of the shoes relative to the adjustment device. Upon reference to Figure 3, it will be noted that the aforesaid ends of the web portions 19 of the brake shoes are slotted, as at 40, to provide radially spaced opposed shoulders 41 which are adapted to engage adjacent portions of the heads 38 of the links to cooperate with the slots 39 in maintaining the links and shoes in assembled relationship.

Referring again to Figure 3 of the drawings, it will be noted that the links are provided with threaded shank portions 42 extending toward each other through the openings 35 in the flanges 34 of the bracket 32 and adapted to respectively threadedly engage the bushings 44 and 45. In the specific embodiment of the invention, the sleeve 44 is internally threaded in a left-hand direction for engagement with the corresponding threads of the shank portion of the link 36, and the sleeve 45 is internally threaded in a right-hand direction for engagement with the correspondingly threaded shank portion of the link 37. The construction is such that rotation of the sleeves relative to the links in one direction effects a separation of the adjustment links and, as a consequence, moves the brake shoes radially outwardly toward the brake flange 12.

For accomplishing the above adjustment, the adjacent ends of the sleeves are provided with outwardly extending annular flanges 46 arranged in abutting engagement and being peripherally notched, as at 47, for engagement with a suitable tool, such as a screw driver. In this connection, it will be noted that the backing plate 14 and the base portion 33 of the bracket 32 are provided with aligned openings 47' therethrough of sufficient dimension to permit a tool to be inserted through the drum into engagement with the notches on the flanges 46. In this manner, the clearance between the brake linings 21 on the shoes and the brake flange may be accurately adjusted to provide the desired brake operation. Attention may be called to the fact at this time that in the event the friction lining on one shoe wears at a faster rate than the friction lining on the other shoe, the sleeve associated with the shoe of greatest wear may be rotated to a greater extent than the other sleeve to compensate for this differential wear.

Figure 3:
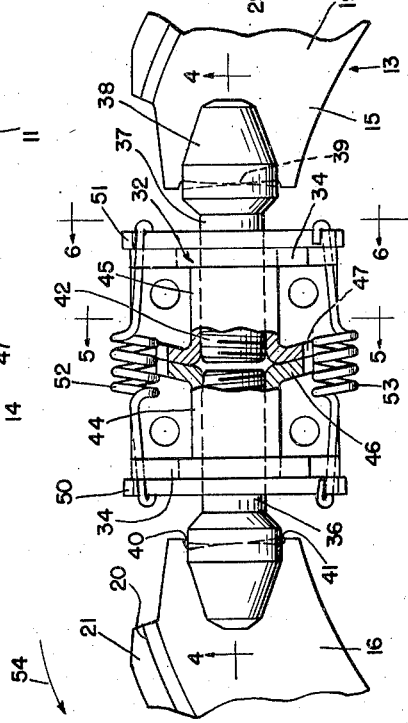
Figure 3 is an enlarged elevational view, partly in section, of the adjustment device for the brake friction means.

The outer ends of the threaded sleeves 44 and 45 extend through the openings 35 in the flanges 34 of the bracket 32 and respectively abut the plates 50 and 51 positioned in engagement with the outer sides of the flanges 34. These plates are normally held into engagement with the outer surfaces of the flanges 34 on the bracket 32 by means of springs 52 and 53. As shown in Figure 3, opposite ends of the spring 52 are connected to the radially inner ends of the plates and the opposite ends of the spring 53 are connected to the radially outer ends of the plates. These springs operate through the plates to maintain the flanges 46 in abutting relationship and these flanges are tapered in the manner shown in Figure 3 to support the inner ends of the sleeves in alignment with each other. As a consequence, when the brake drum is rotating in the direction of the arrow 54 in Figure 3 and the brake shoes are engaged with the brake flange of the drum by the actuator 17, the torque generated in the primary shoe 15 is transferred to the secondary shoe 16 through the adjustment links and associated sleeves. Inasmuch as the outer end of the sleeve 44 abuts the plate 50, it follows that this plate will move circumferentially of the brake drum as a unit with the adjustment device and shoes against the action of the springs 52 and 53. In other words, the plate 50 is moved by the torque away from the adjacent flange 34 on the bracket 32 and the springs are stretched or tensioned. On the other hand, when the brake is applied in the opposite direction of rotation of the drum, the torque generated in the shoe 16 effects a movement of the plate 51 circumferentially of the drum in a direction away from the adjacent flange 34 on the bracket 32 against the action of the springs 52 and 53. As a result, the torque is transferred through the adjustment device in both directions of rotation of the brake drum and this appreciably increases the braking efficiency.

When the brake is released, the springs 52 and 53 will, of course, return either of the plates 50 or 51 to their normal position in abutting engagement with the adjacent flange 34 on the bracket 32. Assuming, for example, that the plate 51 has been moved by the adjustment sleeves and links to a position spaced from the adjacent flange 34 of the bracket 32 and that the shoes are released from engagement with the brake flange of the drum, the springs 52 and 53 immediately act through the plate 51 to return the sleeves and associated links to their center position in the drum. Inasmuch as the adjacent ends of the shoes are held into engagement with the links, it follows that the shoes will follow the links and assume a centered position in the drum. The action is the same when the plate 50 is moved in spaced relation to the adjacent flange 34 of the bracket 32 and the shoes are released so that the shoes are accurately centered in the drum, irrespective of the direction of rotation thereof.

If desired, the base 33 of the bracket 32 may be adjustably secured to the backing plate 14 in order to permit the friction means to be accurately centered during assembly. This may be readily accomplished by securing the bracket to the backing plate with suitable bolts 58, extending through openings 59 in the backing plate, which are elongated in a direction circumferentially on the brake drum. Suitable clamping nuts cooperate with the heads of the bolts to clamp the bracket to the backing plate and the bracket may be readily shifted circumferentially in the drum by merely loosening these nuts.

The embodiment of the invention illustrated in Figures 7 to 9, inclusive, differs from the one previously described in that the two bushings 44' and 45' are maintained in axial alignment by means of a plug 60 supported in the adjacent ends of the bushings between the adjustment links 36' and 37'. As a consequence, it is not necessary to taper the flanges 46' and the two sleeves may be identical with the exception of the direction of the threads. Also, in this construction, the U-shaped bracket 32 is eliminated and the sleeves are supported on a plate 61 by means of a pair of saddle clamps 62. The saddle clamps may either be formed integral with or separate from the plate 61 and, in the event the saddle clamps are formed integral with the plate 61, the latter is secured to the backing plate 14' in a manner similar to the bracket 32 so as to permit accurately adjusting the brake friction means to center the latter in the brake drum during assembly. On the other hand, if the saddle clamps are separate from the plate, provision is made for independently adjusting the same to secure the proper centering of the shoes in the drum. The principle of operation of the adjustment device illustrated in Figures 7 to 9, inclusive, is the same as the adjustment device described in connection with Figures 1 to 6, inclusive.

In both of the embodiments of the invention selected herein for the purpose of illustration, provision is made for supporting the adjustment device in such a manner as to permit the same to shift with the brake friction means relative to the brake drum in opposite directions. Also, both of the embodiments of the invention contemplate means cooperating with the adjustment device to effectively return the brake friction means to its center position within the drum after each brake application.

What I claim as my invention is:

1. In brake mechanism, a brake drum, brake friction means supported within said drum and having spaced ends, a pair of links located between the ends of the friction means with the outer ends non-rotatably engaging said ends of the friction means and having the inner ends threaded with the threads on one link extending in one direction and with the threads on the other link extending in the opposite direction, and a pair of sleeves respectively threaded on the adjacent ends of the links for rotation relative to each other and adapted to be separately or simultaneously rotated to spread the ends of the friction means.

2. In brake mechanism, a brake drum, brake friction means supported within said drum and having spaced ends, a pair of links located between the ends of the friction means with the outer ends non-rotatably engaging said ends of the friction means and having the inner ends threaded with the threads on one link extending in one direction and with the threads on the other link extending in the opposite direction, and a pair of sleeves respectively threaded on the adjacent ends of the links and having peripherally notched annular flanges extending radially outwardly from adjacent ends of the sleeves providing for rotation of either or both of the sleeves relative to the links to effect an adjustment of the friction means radially of the brake drum.

3. In brake mechanism, a brake drum, brake friction means supported within said drum and having spaced ends, a pair of links located between the ends of the friction means with the outer ends non-rotatably engaging said ends of the friction means and having the inner ends threaded with the threads on one link extending in one direction and with the threads on the other link extending in the opposite direction, a pair of sleeves respectively threaded on the adjacent ends of the links and having peripherally notched annular flanges extending radially outwardly from adjacent ends of the sleeves providing for rotation of either or both of the sleeves relative to the links to effect an adjustment of the friction means radially of the brake drum, and yieldable means normally urging the radially outwardly extending flanges on the sleeves into abutting engagement.

4. In brake mechanism, a brake drum, brake friction means supported within said drum for shifting movement circumferentially of the drum in opposite directions and having spaced ends, means for adjusting the brake friction means relative to the drum including an adjustment device supported between the spaced ends of the friction means and shiftable with the latter in both of the aforesaid directions, said adjustment device comprising a pair of links located between the ends of the friction means with the outer ends non-rotatably engaging the ends of the friction means and having the inner ends threaded with the threads on one link extending in one direction and with the threads on the other link extending in the opposite direction, a pair of relatively rotatable sleeves respectively threaded on the adjacent ends of the links and rotatable separately or as a unit to adjust the friction means relative to the brake drum, and means cooperating with the adjustment device to accurately center the friction means within the brake drum.

5. In brake mechanism, a brake drum, brake friction means supported within said drum for shifting movement circumferentially of the drum in opposite directions and having spaced ends, means for adjusting the brake friction means relative to the drum including an adjustment device supported between the spaced ends of the friction means and shiftable with the latter in both of the aforesaid directions, said adjustment device comprising a pair of links located between the ends of the friction means with the outer ends non-rotatably engaging the ends of the friction means and having the inner ends threaded with the threads on one link extending in one direction and with the threads on the other link extending in the opposite direction, a pair of sleeves respectively threaded on the adjacent ends of the links and having annular flanges extending radially outwardly from the adjacent ends thereof providing for rotation of either or both of the sleeves relative to the links to adjust the friction means relative to the drum, yieldable means normally maintaining the radially outwardly extending flanges into abutting engagement, and means coacting with the yieldable means and sleeves for accurately centering the friction means within the brake drum.

6. In brake mechanism, a brake drum, a backing plate for the brake drum, brake friction means supported on the backing plate within the drum for shifting movement relative to the backing plate circumferentially of the drum in opposite directions and having spaced ends, a pair of circumferentially spaced abutments supported on the backing plate between the ends of the friction means, a member positioned at the outer side of each abutment and normally maintained into abutting engagement with the outer sides of the abutments by spring means, a pair of links located between the ends of the friction means with the outer ends non-rotatably engaging said ends of the friction means and having the inner ends extending through openings in said members and abutments, the inner end portions of the links being threaded with the threads on one link extending in one direction and with the threads on the other link extending in the opposite direction, a sleeve threadedly mounted on each link and having portions extending through the abutments into engagement with the members, and means for rotating the sleeves to effect an adjustment of the friction means relative to the brake drum.

7. In brake mechanism, a brake drum, a backing plate for the brake drum, brake friction means supported on the backing plate within the drum for shifting movement relative to the backing plate circumferentially of the drum and having spaced ends, a pair of links located between the ends of the friction means with the outer ends non-rotatably engaging said ends of the friction means with the threads on one link extending in one direction and with the threads on the other link extending in the opposite direction, a pair of sleeves respectively threaded on the adjacent ends of the links for rotation relative to each other and adapted to be rotated separately or as a unit to adjust the friction means relative to the brake drum, a member positioned at the outer end of each sleeve in abutting engagement therewith, spring means normally urging the members toward each other into abutting engagement with the outer ends of the sleeves, and means fixed to the backing plate in predetermined relationship to the center position of the friction means in the drum and having portions engageable with said members to limit the extent of movement thereof toward each other by the spring means.

8. In brake mechanism, a brake drum, a backing plate for the brake drum, brake friction means supported on the backing plate within said drum for shifting movement circumferentially of the drum in opposite directions and having spaced ends, a pair of links located between the ends of the friction means with the outer ends thereof non-rotatably engaging said ends of the friction means and having the inner ends threaded with the threads on one link extending in one direction and with the threads on the other link extending in the opposite direction, a sleeve threaded on each link and having radially outwardly extending flanges at the adjacent ends thereof providing for rotation of the sleeves to effect adjustment of the friction means relative to the drum, a member abutting a portion of each sleeve, yieldable means normally urging the members toward each other into abutting engagement with the portions aforesaid of the sleeves and operable to maintain the flanges on the adjacent ends of the sleeves into abutting relationship, and a pair of stops fixed to the backing plate and engageable with said members to limit the extent of movement of the members toward each other under the influence of the spring means and effective to accurately center the friction means within said drum.

9. In brake mechanism, a brake drum, brake friction means supported within said drum and having spaced ends, a pair of links located between the ends of the friction means with the outer ends non-rotatably engaging said ends of the friction means and having the inner ends threaded with the threads on one link extending in one direction and with the threads on the other link extending in the opposite direction, a sleeve threaded on each link and rotatable relative to the links and to each other to effect adjustment of the friction means, and means for maintaining the sleeves in axial alignment.

10. In brake mechanism, a brake drum, brake friction means supported in said drum and having spaced ends, a pair of fixed abutments extending between the ends of the friction means in spaced relation from each other circumferentially of the drum and having openings therethrough, a pair of links located between the ends of the friction means with the outer ends non-rotatably engaging the ends of the friction means and having the inner ends threaded with the threads on one link extending in one direction and with the threads on the other link extending in the opposite direction, a pair of sleeves respectively threaded on the adjacent ends of the links for rotation relative thereto and having the outer end portions freely slidably supported in the openings in said abutments, and means normally urging the sleeves in directions toward each other.

11. In brake mechanism, a brake drum, a backing plate for said drum, brake friction means supported on the backing plate in the drum and having spaced ends, a pair of abutments fixed to the backing plate in spaced relation to each other circumferentially of the drum and extending between the ends of the friction means, a pair of links located between the ends of the friction means with the outer ends non-rotatably engaging the ends of the friction means and having the inner ends threaded with the threads on one link extending in one direction and with the threads on the other link extending in the opposite direction, a pair of sleeves respectively threaded on the adjacent ends of the links for rotation relative thereto and having the outer end portions extending freely through openings in the abutments, a member at the outer side of each abutment engageable with a portion of the adjacent sleeve, and yieldable means normally urging said members in directions toward each other in engagement with the outer sides of the abutments.

12. In brake mechanism, a brake drum, brake friction means supported within the drum and having spaced ends, a pair of links located between the ends of the friction means with the outer ends non-rotatably engaging said ends and having the inner ends threaded with the threads on one link extending in one direction and with the threads on the other link extending in the opposite direction, and a sleeve threaded on each link for rotation relative to said links and having outwardly extending flanges on adjacent ends thereof inclined in the same direction with respect to a plane perpendicular to the plane of rotation of the drum and cooperating with one another to support the adjacent ends of the links and sleeves in alignment with each other.

13. In brake mechanism, a brake drum, brake friction means supported in the drum for shifting movement circumferentially of the drum and having spaced ends, a pair of fixed abutments extending between the ends of the friction means in spaced relation to each other circumferentially of the drum and having aligned openings therethrough, a pair of links located between the ends of the friction means with the outer ends non-rotatably engaging said ends of the friction means and having the inner ends threaded with the threads on one link extending in one direction and with the threads on the other link extending in the opposite direction, a pair of sleeves respectively threaded on the adjacent ends of the links for rotation relative to the links and having the outer end portions freely extending through the openings in the fixed abutments, means cooperating with the fixed abutments and sleeves for yieldably resisting shifting movement of the sleeves and links with the friction means, and means for supporting the adjacent ends of the sleeves in alignment with each other.

CHARLES A. SAWTELLE.